July 14, 1942.  A. F. UNDERWOOD  2,289,572
BEARING
Filed July 2, 1941
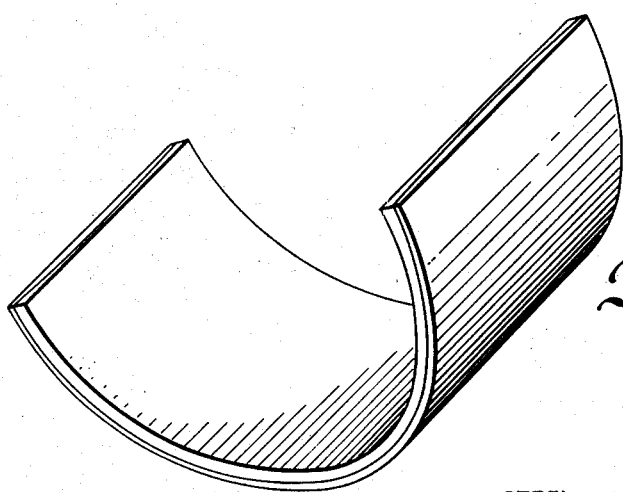
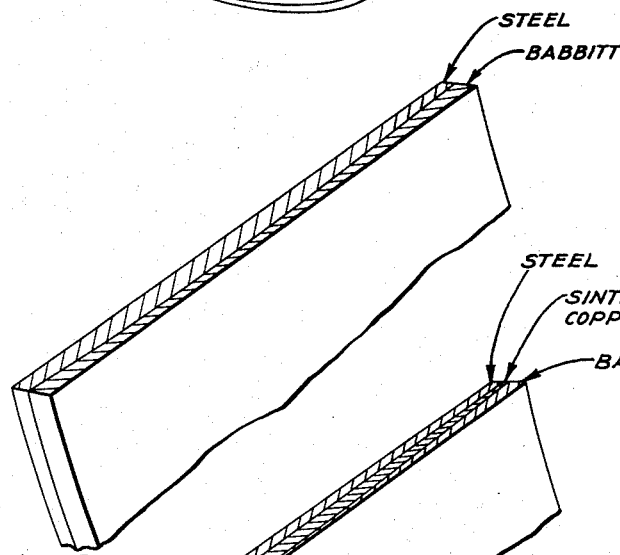
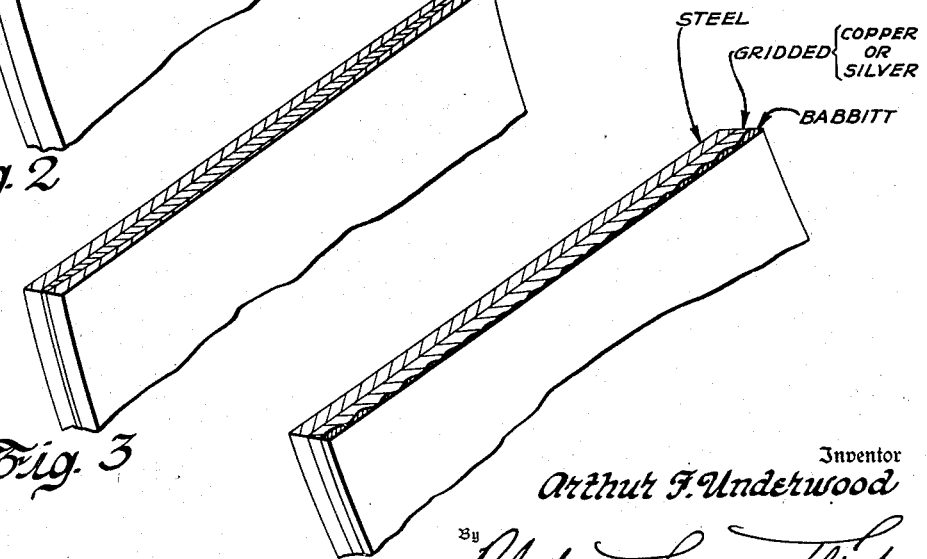
Inventor
Arthur F. Underwood
By Blackmore, Spencer & Flint
Attorneys Patented July 14, 1942

2,289,572

UNITED STATES PATENT OFFICE 2,289,572

BEARING

Arthur F. Underwood, Grosse Pointe, Mich., assignor to General Motors Corporation, Detroit, Mich., a corporation of Delaware Application July 2, 1941, Serial No. 400,785

7 Claims. (Cl. 308—237)

This invention relates to plain bearings. Such bearings usually fail from either fatigue or scoring.

In an ideal bearing installation for a revolving shaft, the highest oil film pressure should occur at the middle of the length of the bearing where the bearing has, or should have, the greatest strength. In practice, however, due to misalignment of the shaft in its bearing, the highest oil film pressure frequently occurs in a smaller load supporting oil film area towards the end, or at the very edge, of the bearing where it is weaker than at the middle of its length. When this is the case, failure from either fatigue or scoring is much sooner likely to occur.

Attempts have been made to ensure that the greatest pressure is borne at the middle of a bearing by increasing the clearance between a shaft and its bearing from the middle thereof towards its ends, by making the bearing with a tapered bore so that it is bell-mouthed. It is, however, difficult to obtain the correctly tapered bell-mouthed contour of the bearing surface for any particular installation.

The object of the present invention is a bearing of increased life, wtih a straight bearing surface which is more readily comformable towards its ends.

The above and other objects of the invention will be apparent as the description proceeds.

The drawing shows different examples of bearing construction according to the invention.

In the drawing:

Figure 1 is a perspective view of a half bearing shell according to the invention.

Figure 2 is an enlarged perspective view of part of Figure 1.

Figure 3 is a view similar to Figure 2 of a modification of the invention.

Figure 4 is a view similar to Figure 2 of another modification of the invention.

The bearings shown in the drawing are all steel backed, and their antifriction linings have a straight bearing surface which gradually increases in thickness from the middle of the bearing towards its ends.

The steel back of the bearing of Figures 1 and 2 has a surface adjacent its lining of antifriction material which is crowned or arched. The lining of antifriction material (babbitt) has a straight bearing surface lengthwise of the bearing and hence gradually increases in thickness from the middle towards its ends. For example, the thickness of the babbitt at the middle of the bearing might be .002" to .004" increasing to, say, .007" to .011" at its ends.

The bearing of Figure 3 has a layer of bearing material consisting of sintered copper-nickel interposed between a lining of softer antifriction material and a steel back. In this case the sintered copper-nickel, bonded to the steel back, has a surface adjacent its lining of antifriction material which is crowned or arched. The copper-nickel is preferably sintered in the crowned surface shape but it may be rolled to this form after sintering.

The bearing of Figure 4 is a "grid" type bearing of copper or silver bonded to a steel back. It has an embossed "gridded" surface produced by a straight roller with increasingly deeper and coarser grids or interstices towards its ends. A lining of softer antifriction material (babbitt) is applied to the embossed surface of the bearing, filling the interstices.

As shown in all the examples illustrated, the lining of antifriction material has a straight bearing surface and gradually increases in thickness from the middle of the bearing towards its ends, although the actual thickness required is less in the copper-nickel bearings because the copper-nickel bearing material itself has a greater degree of conformability than steel.

It will be appreciated that bearings according to the invention have maximum strength at their middle and maximum conformability at their ends, which will insure that the load of a shaft on such bearings is a maximum at their middle of maximum strength despite any misalignment of the shaft in such bearings.

I claim:

1. A plain bearing for a shaft, said bearing being provided with a lining of conformable antifriction material supported throughout its length, and of which the thickness gradually increases from the middle of the bearing towards its ends to constitute a bearing of maximum strength at its middle and maximum conformability at its ends, thereby insuring that the load of said shaft on the bearing is a maximum at its middle of maximum strength despite any misalignment of the shaft in its bearing.

2. The combination according to claim 1 in which the bearing has a steel back which has a crowned surface adjacent its lining of antifriction material which has a straight bearing surface.

3. A plain bearing for a shaft, said bearing having a layer of suitable bearing material interposed between a lining of softer antifriction material and a backing for the bearing; said bearing material having a crowned surface adjacent the lining which has a straight bearing surface for the shaft.

4. The combination according to claim 3 in which the bearing material is copper-nickel bonded to a steel backing, and the antifriction lining is Babbitt metal.

5. A plain bearing for a shaft, said bearing being of the grid type with a layer of suitable bearing material having an embossed surface to which a softer antifriction material is applied, filling the interstices, said bearing material being more deeply and coarsely embossed towards the ends of the bearing, whereby the thickness of the softer antifriction material gradually increases from the middle of the bearing towards its ends.

6. The combination according to claim 5, in which the bearing material is copper bonded to a steel backing, and the antifriction lining is Babbitt metal.

7. The combination according to claim 5, in which the bearing material is silved bonded to a steel backing, and the antifriction lining is Babbitt metal.

ARTHUR F. UNDERWOOD.